United States Patent
Wong et al.

(10) Patent No.: US 6,947,975 B2
(45) Date of Patent: Sep. 20, 2005

(54) MOBILE DEVICE PERIPHERAL INTERFACE SYSTEM AND METHOD

(75) Inventors: Yoon Kean Wong, Menlo Park, CA (US); David Kammer, Seattle, WA (US); David Z. Creemer, Palo Alto, CA (US); Steven C. Lemke, Sunnyvale, CA (US)

(73) Assignee: Palm, Inc., Santa Clara, CA (US)

( * ) Notice: Subject to any disclaimer, the term of this patent is extended or adjusted under 35 U.S.C. 154(b) by 785 days.

(21) Appl. No.: 09/970,261

(22) Filed: Oct. 3, 2001

(65) Prior Publication Data

US 2003/0065714 A1 Apr. 3, 2003

(51) Int. Cl.⁷ .............................................. G06F 15/16
(52) U.S. Cl. .................. 709/217; 709/217; 709/219; 709/208; 709/246
(58) Field of Search ............................. 709/217, 219, 709/208, 246, 292, 28

(56) References Cited

U.S. PATENT DOCUMENTS

| | | | |
|---|---|---|---|
| 4,486,624 A | 12/1984 | Puhl et al. | |
| 5,797,089 A * | 8/1998 | Nguyen | 455/403 |
| 5,839,064 A | 11/1998 | Foti | |
| 5,964,847 A | 10/1999 | Booth, III et al. | |
| 6,016,476 A | 1/2000 | Maes et al. | |
| 6,195,589 B1 * | 2/2001 | Ketcham | 700/28 |
| 6,206,480 B1 | 3/2001 | Thompson | |
| 6,437,836 B1 * | 8/2002 | Huang et al. | 348/734 |
| 6,631,310 B1 * | 10/2003 | Leslie | 700/292 |
| 6,657,654 B2 * | 12/2003 | Narayanaswami | 348/14.04 |
| 6,757,719 B1 * | 6/2004 | Lightman et al. | 709/219 |

* cited by examiner

*Primary Examiner*—Saleh Najjar
*Assistant Examiner*—Sahera Halim
(74) *Attorney, Agent, or Firm*—Foley & Lardner LLP

(57) ABSTRACT

A method of utilizing mobile device data on an alternative device is disclosed. The method includes establishing a communications link between the mobile device and the alternative device. The method also includes transferring program information from the mobile device to the alternative device, and executing the program on the alternative device. The method further includes utilizing data, from the mobile device, by the program.

36 Claims, 4 Drawing Sheets

MOBILE DEVICE PERIPHERAL INTERFACE SYSTEM AND METHOD

BACKGROUND

The present invention relates generally to the field of methods or systems for any mobile devices to use other computation, interface, and/or communication resources by assuming a standardized execution environment and downloading code or a reference to code, downloading standardized data for local display and manipulation, direct or indirect hardware control and/or using a meta user interface interpretation (e.g., X windows).

Mobile communications and computation devices come in many forms, but conventionally include portability versus utility compromises in the design. For example, a watch is conventionally a very portable device, but of limited functionality. If a watch included a 20-inch monitor, for example, attached to it, the user could display, navigate, and interact with the system to a very high degree. However, in this exaggerated example, the watch would be of very low portability. Handheld computer, personal digital assistant, and mobile phone designers, among others, are especially aware of this tradeoff, especially as these devices are being asked to include more functionality and asked to carry out more sophisticated tasks. However, although the mobile devices are being asked to provide more functionality, a paramount requirement is that the device remain easily portable.

Accordingly, there is a need for interfacing highly mobile devices (e.g., handheld computers, personal digital assistants, mobile phones, and watches) to devices which include more rich and usable computation, communication, or interaction capabilities, which may be less portable. There is also a need for a standardized environment for mobile devices to work in concert with less mobile, more powerful devices.

Certain custom solutions have been devised. For example, systems including a handheld computer connected to a personal computer with a specialized cradle attached, may be used in which specialized custom software is run both on the handheld computer and the personal computer (PC). As the user connects the two devices, he may, for example, wish to do large amounts of data entry on the PC because the PC is a much more efficient data manipulation system. The difficulty here is that there is a requirement of a custom solution on both ends of the link and there is no facility for utilizing the resources available on the PC unless the customized software is available on both ends of the link.

Further, there is a need for standardizing the communication of data and programs between the portable device and the less portable, more function-rich device. Providing such standardized communication provides greater utility to the portable or mobile devices, as they can be used in concert with many widely deployed systems.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs

SUMMARY

An exemplary embodiment of the invention relates to a method of utilizing mobile device data on an alternative device. The method includes establishing a communications link between the mobile device and the alternative device, transferring program information from the mobile device to the alternative device, executing the program on the alternative device, and utilizing data, from the mobile device, by the program.

Another exemplary embodiment of the invention relates to a method of utilizing mobile device data on an alternative device. The method includes establishing a communications link between the mobile device and the alternative device, transferring data in a standardized format from the mobile device to the alternative device, and utilizing data in the standardized format, from the mobile device, by the alternative device.

Yet another exemplary embodiment of the invention relates to a method of utilizing mobile device data on an alternative device. The method includes running a host control program on the alternative device and establishing a communications link between the mobile device and the host control program on the alternative device, and utilizing hardware associated with the alternative device, by the mobile device. The utilization by the mobile device is enabled by the host control program.

Yet still another exemplary embodiment of the invention relates to a data processing system. The system includes a mobile electronic device, a second electronic device including at least one resource available to the second electronic device and the mobile electronic device in communications with the second electronic device. The system also includes a program running on the second electronic device, the program enables the use of the at least one resource, by the mobile electronic device.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
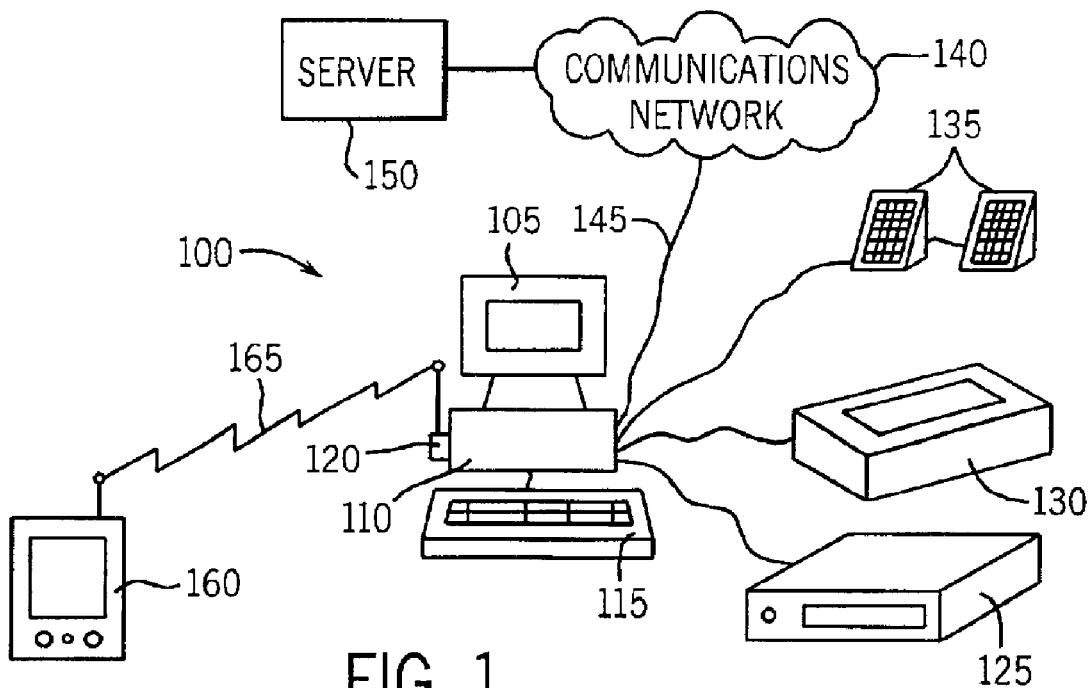
FIG. 1 is a diagrammatic representation of a mobile device in communication with a personal computer.

Referring now to FIG. 1, a personal computer system or other hardware system 100 is depicted. Personal computer system 100 includes a display 105, a central processing unit 110 coupled to display 105, a keyboard 115 coupled to CPU 110, a wireless access device 120, such as, but not limited to an 802.11 device, a Bluetooth device, etc. Personal computer 100 also includes peripheral devices such as storage devices, shown as disk drive 125, printing devices 130 and audio devices, shown as speakers 135. Personal computer 100 is coupled to communications network 140 by any of a wired or wireless connection 145. Communications network 140 may be any of a variety of communications networks including the internet, a wide area network, a local area network, etc. Communications network 140 may be coupled to any of a variety of server computers, represented by server 150. In an exemplary embodiment a mobile device, shown as handheld computer 160 is in communications with wireless communications adapter 120 via a wireless link 165. Further, in an alternative embodiment, wireless link 165 may be a wired link such as a universal serial bus (USB), parallel, and/or serial link, e.g. As handheld computer 160 connects to personal computer 100, or any other alternative device, the connection of handheld computer 160 to personal computer 100 initiates the transfer of a software application, such as, but not limited to a job application from the mobile device to the personal computer host.

In an alternative embodiment, handheld computer 160 transfers a reference or a hyperlink to the program via a URL, which the host then downloads from a server, such as server 150 coupled to communication network 140. In an exemplary embodiment, handheld computer 160 send a URL to personal computer 100 that connects to the internet over communications link 145 and downloads the software application from server 150. The software application is then run on personal computer 100. As the software application is executed by the personal computer, data from handheld computer 160 is then utilized by personal computer 100 for a variety of tasks, including, but not limited to editing, and other data manipulation, etc. For example, the software application running on personal computer 100 could connect to handheld computer 160, download contact information, and present it to the user of personal computer 100 in an application which is designed for the PC environment and enables tasks such as editing, and data manipulation, for example.

Figure 4:
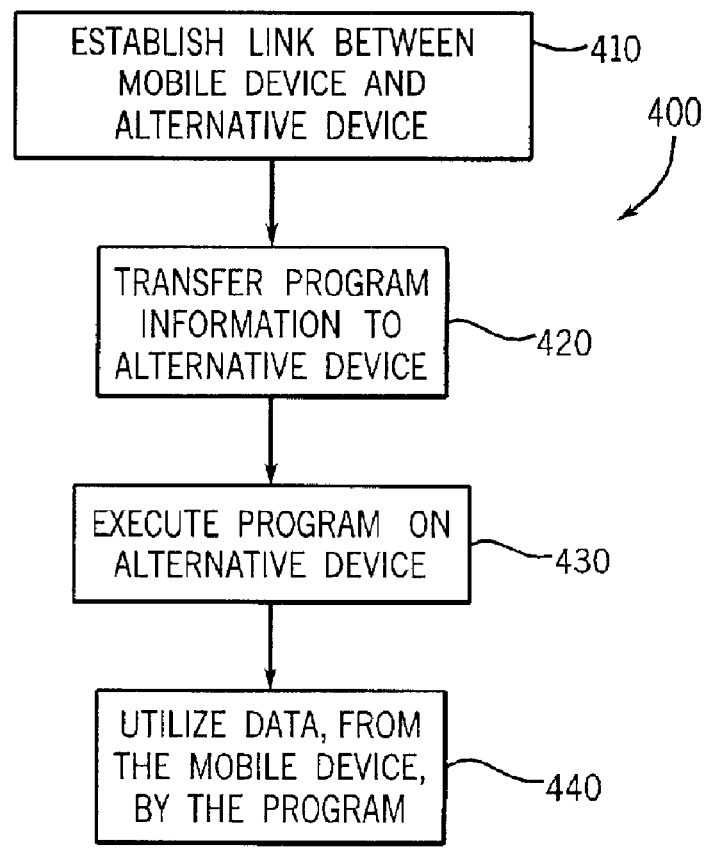
FIG. 4 is a flow diagram of a method of utilizing data from a mobile device and an alternative device.

Referring now to FIG. 4, a flow diagram 400 depicts the general steps in carrying out the described method. A link between handheld computer 160 and personal computer 100 is established (step 410). Once the link is established, a program or program information is transferred to personal computer 100 from handheld computer 160 (step 420). Once the program has been downloaded by personal computer 100 either from handheld computer 160 or from communications network 140, the program is executed on personal computer 100 (step 430). With the program running, data may be utilized from the mobile device by the program running on personal computer 100 (step 440).

Figure 5:
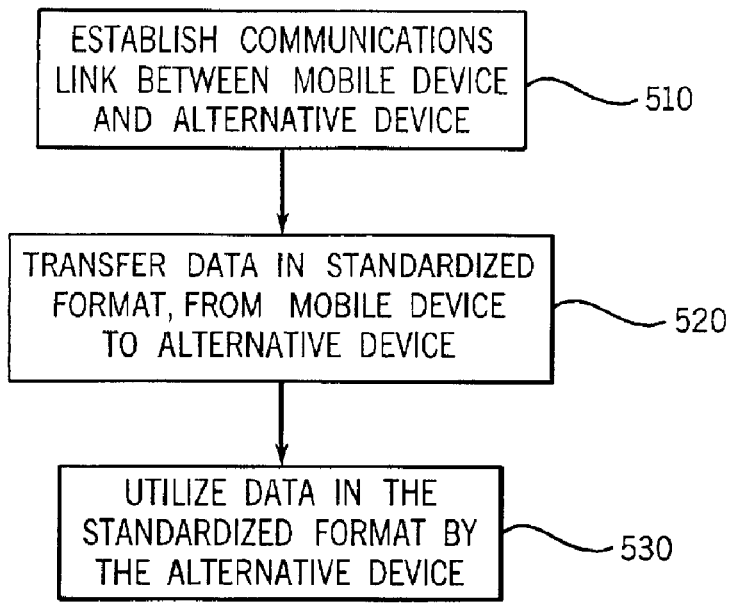
FIG. 5 is a flow diagram of a method of utilizing data in a standardized format by an alternative device.

Referring now to FIG. 5, in an alternative implementation, a communications link between handheld computer 160 and personal computer 100 is established (step 510) once the communications link is established, handheld computer 160 transmits, to personal computer 100, a catalog of information in a well-known or standardized format. The standardized format may be any of a variety of standardized and well known formats such as, but not limited to extensible mark up language (XML), hypertext mark up language (HTML), extended hypertext mark up language (XHTML), rich text format (RTF), virtual cards (vcards), etc. The transfer of data in the standardized format is carried out in a step 520. Once the data has been transferred, the alternative device, such as personal computer 100 may utilize data in the standardized format (step 530) for any of a variety of tasks, such as, but not limited to, editing, manipulation, organization, etc.

Figure 6:
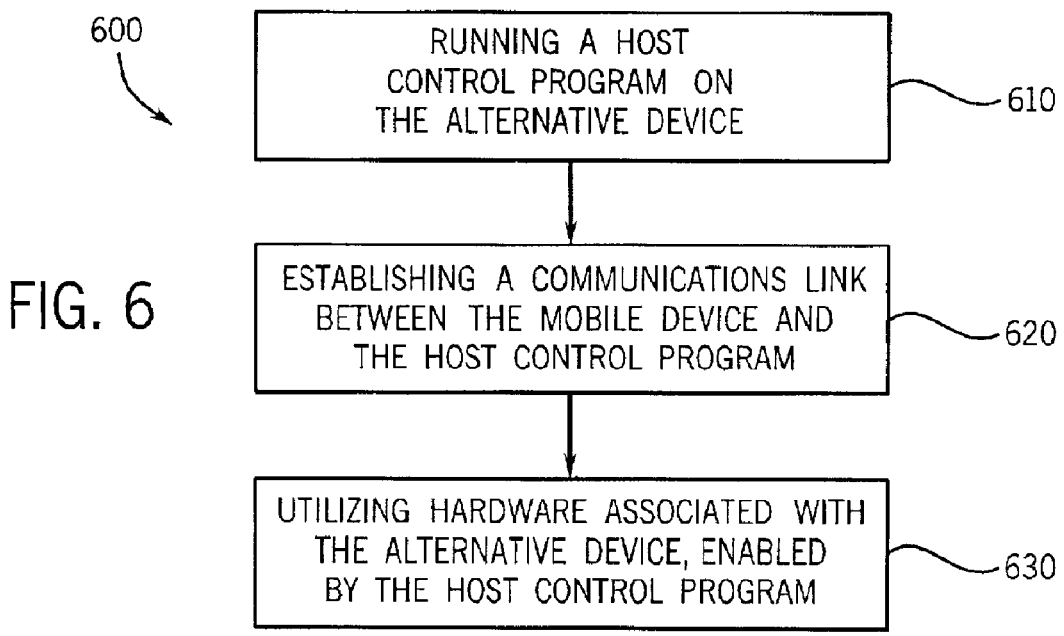
FIG. 6 is a is a flow diagram of a method of utilizing hardware associated with an alternative device by a mobile device.

Referring now to FIG. 6, an alternative method 600 of utilizing hardware that is associated with the alternative device is depicted. A host control program is run on the alternative device such as personal computer 100 (step 610). A communications link between handheld computer 160 and personal computer 100 is established (step 620). Hardware associated with personal computer 100 is then enabled by the host control program (step 630). Accordingly, connection to personal computer 100 enables handheld computer 160 to communicate with the host software component which makes certain hardware, such as, but not limited to keyboard 115, disk drive 125, printer 130, speakers 135, communications network connection 145, display 105, CPU 100, etc. which are all connected to personal computer 100, available to handheld computer 160. For example, on connecting to personal computer 100, handheld computer 160 would communicate with the host program, which would inform handheld computer 160 of the availability of keyboard 115. Keyboard 115 would then be enabled by the handheld computer operating system running on handheld computer 160. Accordingly, data could be entered directly to handheld computer 160 by the utilization of keyboard 115. Similarly, handheld computer 160 could gain use of display 105, speakers 135, other networking devices, peripherals, and/or other resources. The result may be achieved through handheld 160 operating system device drivers talking with the host control application running on personal computer 100.

Figure 2:
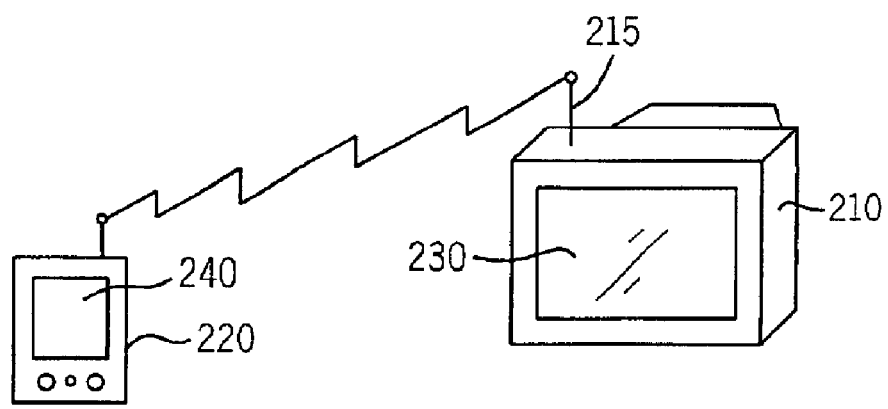
FIG. 2 is a diagrammatic depiction of a mobile device in communication with a display device.

Referring now to FIG. 2, in an alternative exemplary embodiment, a stand alone television or other display 210 may be equipped with a processing mechanism running a host control program. Further, display 210 may be equipped with a communications device represented by antenna 215 which enables communications between television 210 and handheld computer 220. In such an exemplary embodiment, the host control program running on television 210 would enable a mobile device such as handheld computer 220 to utilize screen 230 for displaying information which would otherwise be displayed on screen 240 of handheld computer 220.

Figure 3:
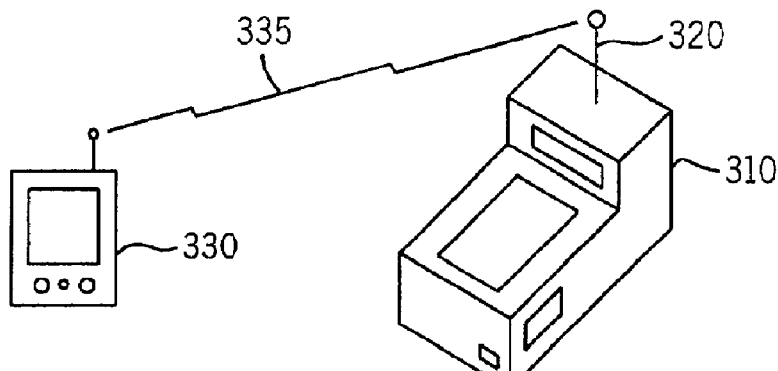
FIG. 3 is a diagrammatic depiction of a mobile device in communication with a printing device.

Referring to FIG. 3, another alternative exemplary embodiment is depicted in which a printer 310 includes a processing device running a host control program and a communications device represented by antenna 320. Printer 310 may be utilized by handheld computer 330 by establishing a communications link 335. Information may then be printed directly on printer 310 at the command of handheld computer 330.

Figure 7:
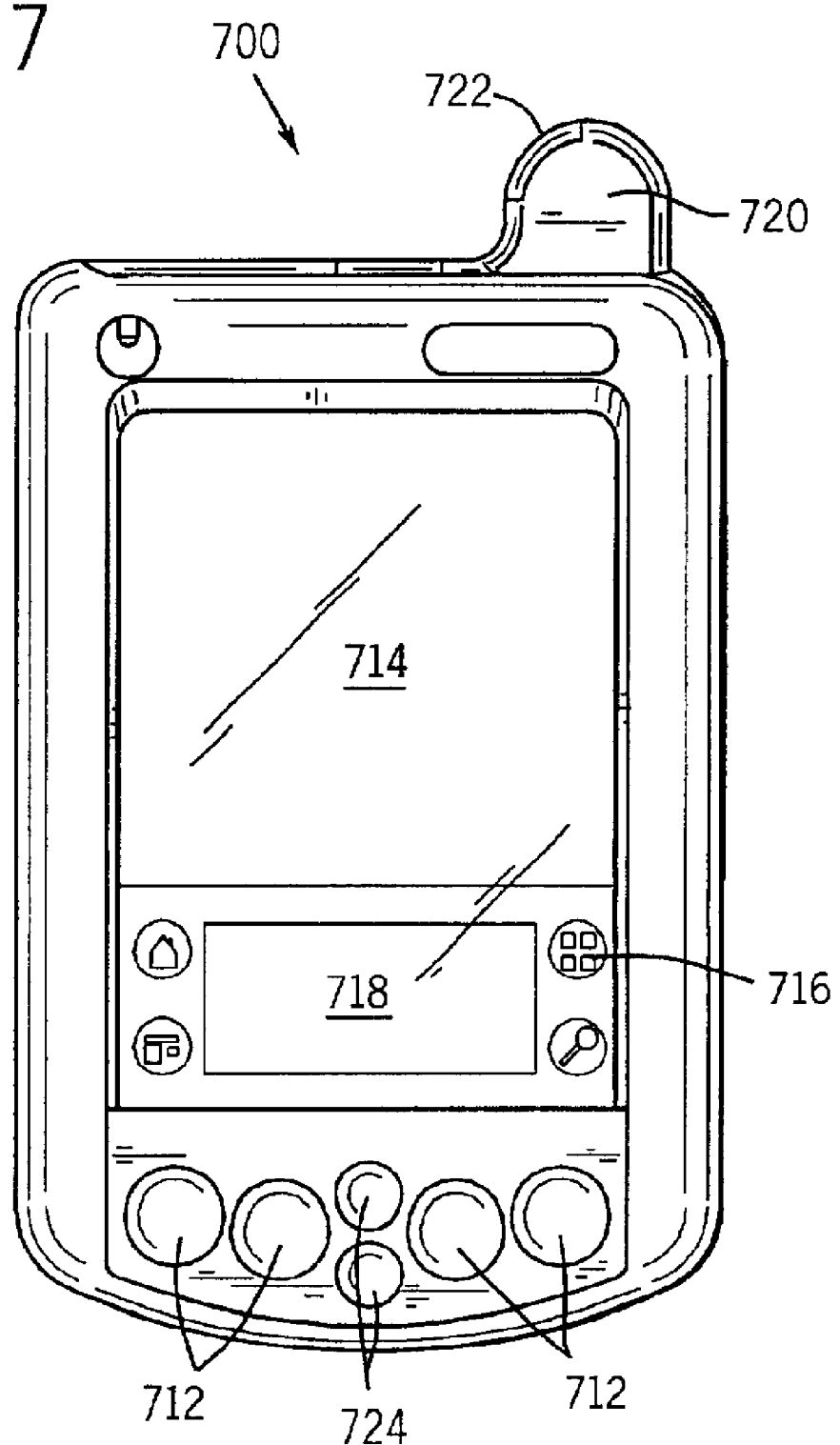
FIG. 7 is an exemplary front elevation view of handheld computer which can be used in the system depicted in FIG. 1.

Referring to FIG. 7, a handheld computer 700 is depicted according to an exemplary embodiment. Handheld computer 700 may include Palm style computers manufactured by Palm, Inc., of Santa Clara, Calif. Other exemplary embodiments may include Windows CE handheld computers, or other handheld computers and personal digital assistants, as well as mobile telephones, and other mobile computing devices. Handheld computer 700 is representative of the type of mobile device which may make use of the invention disclosed and/or be part of the inventive system disclosed.

Preferably, handheld computer 700 includes interactive hardware and software that performs functions such as maintaining calendars, phone lists, task lists, note pads, calculator applications, spreadsheets, games, and other applications capable of running on a computing device.

Further, handheld computer 700 may be configured for such functions as voice memo recording and playback as well as communications network connectivity, internet connectivity, wireless messaging, e-mail, always-on e-mail, and wireless telephony.

Handheld computer 700, depicted in FIG. 7 includes a plurality of input function keys 712 and a display 714 having graphical user interface features. Display 714 may be provided with a touch screen interface that allows a user to select and alter displayed content using a pointer, such as but not limited to a stylus, a pen tip, a fingertip, or other pointing devices.

Referring again to FIG. 7, in an exemplary embodiment, display 714 also includes a Graffiti™ (or other handwriting recognition software) writing section 718 for tracing alphanumeric characters as input. A plurality of input icons 716 for performing automated or preprogrammed functions may be provided on a portion of display 714.

In an exemplary embodiment, handheld computer 700 may include an integrated antenna 720 configured to transmit and receive wireless communication signals, such as, but not limited to, cellular telephone communication signals and other radio frequency (RF) communications signals using an RF transceiver. Antenna 720 may further include an indicator light 722 integrated into antenna 720 for indicating the transmission and reception of wireless communication signals. Further, light 722 may be used to indicate other states of handheld computer 700.

In an exemplary embodiment, handheld computer 700 also includes navigation buttons 724 that may be utilized for navigating or scrolling of information displayed on display 714. Further, navigation buttons 724 may be programmed for other uses depending on the application running on handheld computer 700. Handheld computer 700 may be used for any of a variety of wireless communications, including, but not limited to, communications with the World Wide Web, mobile telephone communications, e-mail communications, etc.

In an exemplary embodiment, handheld computer 700 may be coupled to a cradle, such as a synchronization cradle. Cradle may include a platform configured to receive handheld computer 700, and a power or data cord (which, in an exemplary embodiment may be, but is not limited to a universal serial bus (USB) cord) that may be coupled to a personal computer and a wall outlet to supply power to cradle 730 (alternatively, cradle 730 may draw power through the data cord from the personal computer).

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of utilizing mobile device data on an alternative device, comprising:

establishing a communications link between the mobile device and the alternative device;

transferring a program from the mobile device to the alternative device;

executing the program on the alternative device; and utilizing data transmitted from the mobile device to the alternative device, by the program running on the alternative device.

2. The method of claim 1, wherein the communications link is a wireless link.

3. The method of claim 1, wherein the communications link is a universal serial bus (USB) link.

4. The method of claim 1, wherein the program is a link to a program location on a communications network.

5. The method of claim 1, further comprising:

downloading the program wirelessly to the alternative device.

6. The method of claim 1, wherein the program is an executable program.

7. The method of claim 1, further comprising altering the data on the alternative device is accomplished by using functionality associated with the program.

8. The method of claim 7, further comprising: communicating altered data to the mobile device.

9. The method of claim 1, wherein the program is a Java program.

10. The method of claim 1, wherein the mobile device is a handheld computer.

11. The method of claim 1, wherein the mobile device is a mobile telephone.

12. A method of utilizing mobile device data on an alternative device, comprising:

establishing a communications link between a mobile device and the alternative device;

transferring from the mobile device to the alternative device a link to the location of a program;

accessing the link by the alternative device;

downloading a program to the alternative device;

transferring data in a standardized format from the mobile device to the alternative device; and utilizing data in the standardized format, from the mobile device, by the program running on the alternative device.

13. The method of claim 12, wherein the standardized format is extensible markup language (XML).

14. The method of claim 12, wherein the standardized format is hypertext markup language (HTML).

15. The method of claim 12, wherein the standardized format is extended hypertext markup language (XHTML).

16. The method of claim 12, wherein the standardized format is rich text format (RTE).

17. The method of claim 12, wherein the standardized format is virtual card (vcard).

18. The method of claim 12, wherein the mobile device is a handheld computer.

19. The method of claim 12, wherein the mobile device is a mobile telephone.

20. A method of utilizing mobile device data on an alternative device, comprising: transferring a host control program from a mobile device to the alternative device, running the host control program on the alternative device;

establishing a communications link between the mobile device and the host control program on the alternative device;

utilizing hardware peripherals associated with the alternative device, by the mobile device, the utilization by the mobile device being enabled by the host control program.

21. The method of claim 20, wherein the hardware peripheral is a keyboard.

22. The method of claim 20, wherein the hardware peripheral is a storage device.

23. The method of claim 20, wherein the hardware peripheral is a display device.

24. The method of claim 20, wherein the hardware peripheral is an audio device.

25. The method of claim 20, wherein the hardware peripheral is a communications device.

26. The method of claim 20, wherein the mobile device is a handheld computer.

27. The method of claim 20, wherein the mobile device is a mobile telephone.

28. A data processing system, comprising:
   a mobile electronic device;
   a second electronic device including at least one external resource available to the second electronic device and the mobile electronic device in communications with the second electronic device; and
   a program running on the second electronic device, the program enabling the use of the at least one external resource, by the mobile electronic device, and the program being transferred from the mobile electronic device to the second electronic device.

29. The data processing system of claim 28, wherein the second electronic is a personal computer.

30. The data processing system of claim 28, wherein the second electronic device is a television.

31. The data processing system of claim 28, wherein the external resource is a communications network.

32. The data processing system of claim 28, wherein the external resource is a keyboard.

33. The data processing system of claim 28, wherein the external resource is an audio device.

34. The data processing system of claim 28, wherein the external resource is a networking device.

35. The data processing system of claim 28, wherein the external resource is a data storage device.

36. The data processing system of claim 28, wherein the external resource is a printing device.

\* \* \* \* \*

UNITED STATES PATENT AND TRADEMARK OFFICE
CERTIFICATE OF CORRECTION

PATENT NO. : 6,947,975 B2
DATED : September 20, 2005
INVENTOR(S) : Yoon Kean Wong et al.

It is certified that error appears in the above-identified patent and that said Letters Patent is hereby corrected as shown below:

<u>Column 6,</u>
Line 48, delete "(RTE)" and insert therefor -- (RTF) --.

<u>Column 8,</u>
Line 5, insert -- device -- after "electronic".

Signed and Sealed this

Sixth Day of December, 2005

JON W. DUDAS
*Director of the United States Patent and Trademark Office*